(12) United States Patent
Brewka et al.

(10) Patent No.: US 10,011,431 B2
(45) Date of Patent: Jul. 3, 2018

(54) BELT-ON-BELT CONVEYOR

(71) Applicant: THYSSENKRUPP INDUSTRIAL SOLUTIONS (USA), INC., Greenwood Village, CO (US)

(72) Inventors: Christof Brewka, Highlands Ranch, CO (US); Martin S. Lurie, Englewood, CO (US); R. Steven Kasper, Parker, CO (US)

(73) Assignee: THYSSENKRUPP INDUSTRIAL SOLUTIONS (USA), INC., Greenwood Village, CO (US)

( * ) Notice: Subject to any disclaimer, the term of this patent is extended or adjusted under 35 U.S.C. 154(b) by 0 days.

(21) Appl. No.: 15/111,771

(22) PCT Filed: Jan. 14, 2015

(86) PCT No.: PCT/US2015/011450
§ 371 (c)(1),
(2) Date: Jul. 14, 2016

(87) PCT Pub. No.: WO2015/109008
PCT Pub. Date: Jul. 23, 2015

(65) Prior Publication Data
US 2016/0332822 A1 Nov. 17, 2016

Related U.S. Application Data

(60) Provisional application No. 61/927,410, filed on Jan. 14, 2014.

(51) Int. Cl.
*B65G 23/14* (2006.01)
*B65G 23/36* (2006.01)
(Continued)

(52) U.S. Cl.
CPC ............ *B65G 23/14* (2013.01); *B65G 15/08* (2013.01); *B65G 23/36* (2013.01); *B65G 23/44* (2013.01)

(58) Field of Classification Search
CPC ........ B65G 17/02; B65G 23/02; B65G 23/14; B65G 23/16
(Continued)

(56) References Cited

U.S. PATENT DOCUMENTS 1,970,842 A * 8/1934 Crossen ................. B65G 17/02
198/812
3,261,452 A 7/1966 Thomson
(Continued)

FOREIGN PATENT DOCUMENTS

| CA | 533798 A | 11/1956 |
|---|---|---|
| DE | 562875 C | 10/1932 |

(Continued)

OTHER PUBLICATIONS

English abstract for JPS5836805A.
English Machine translation for DE562875.
English Machine translation for DE2644163.

*Primary Examiner* — James R Bidwell
(74) *Attorney, Agent, or Firm* — thyssenkrupp North America, Inc.

(57) ABSTRACT

A long run conveyor system is disclosed in which at least a portion thereof traverses a slope sufficiently steep so that tensile force associated with overcoming the effects of the slope is greater per unit length than tensile force per unit length of run due to main frictional resistance of the conveyor system. The long run conveyor system includes an external belt defining a continuous loop traversing an entire route of the conveyor system and is configured to transport material load across the entire route. The conveyor system also includes an internal belt positioned inside the continu- (Continued)

ous loop of the external belt, which also traverses substantially the entire route. An upper side of the internal belt operably engages an underside of the external belt. The internal and external belts are configured such that each respectively carries an approximately equal amount of belt tension.

24 Claims, 7 Drawing Sheets

(51) Int. Cl.
    *B65G 23/44*     (2006.01)
    *B65G 15/08*     (2006.01)

(58) Field of Classification Search
    USPC ........................................ 198/833, 820, 821
    See application file for complete search history.

(56) References Cited

U.S. PATENT DOCUMENTS

| | | | | |
|---|---|---|---|---|
| 3,268,065 A | * | 8/1966 | Thomson | B65G 23/00 198/829 |
| 3,343,653 A | | 9/1967 | Thomson | |
| 3,351,179 A | * | 11/1967 | Thomson | B65G 21/14 198/825 |
| 3,433,176 A | | 3/1969 | Takehisa | |
| 3,967,720 A | * | 7/1976 | Arieh | B65G 23/16 198/833 |
| 4,058,204 A | * | 11/1977 | Arieh | B65G 23/36 198/833 |
| 4,440,293 A | * | 4/1984 | Allan | B65G 17/02 198/813 |
| 4,574,943 A | * | 3/1986 | Green | B65G 23/26 192/48.8 |
| 4,609,099 A | * | 9/1986 | Pentith | B65G 15/04 198/833 |
| 5,161,676 A | * | 11/1992 | Gunther | B65G 17/02 198/819 |
| 5,261,527 A | * | 11/1993 | Krismanth | B65G 15/60 198/833 |
| 5,934,862 A | * | 8/1999 | Brown | B60P 1/38 198/833 |

FOREIGN PATENT DOCUMENTS

| | | |
|---|---|---|
| DE | 2644163 A | 4/1977 |
| EP | 1616819 A | 1/2006 |
| GB | 280082 A | 11/1927 |
| JP | S5836805 A | 3/1983 |

* cited by examiner

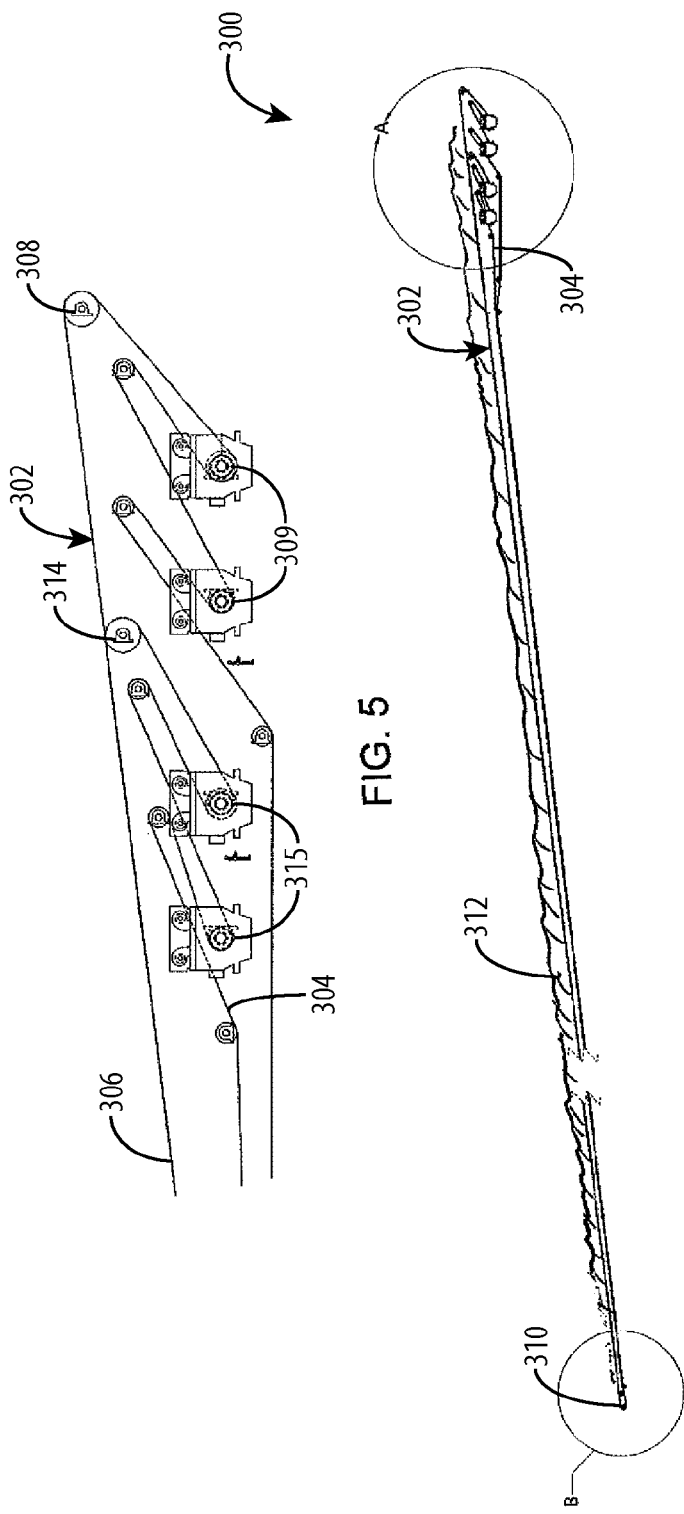

BELT-ON-BELT CONVEYOR

CROSS REFERENCE TO RELATED APPLICATIONS

The present application claims priority to U.S. provisional application No. 61/927,410 Filed 14 Jan. 2014 entitled "Belt-on-Belt Conveyor", which is hereby incorporated herein by reference in its entirety.

TECHNOLOGICAL FIELD

The technological field generally relates to conveyors, and more particularly to belt-on-belt drives for long conveyors for use in conveying bulk materials.

BACKGROUND

In the field of conveying bulk materials by endless-belt conveyors, it is desirable to have as few separate flights as possible making up a conveying system, for reasons of capital and operating cost as well as reliability. This is especially the case for conveyors that run in tunnels from one level of an underground mine to the surface. In such conveyors, transfer stations represent very substantial capital and operating costs, as well as the locations of highest operational risk. The excavation, power, access, and ventilation costs are often multiples of those in a surface drive or transfer station.

A key limitation on the length or lift that can be achieved with a single conveyor flight is the tensile strength of the conveyor belt. On long overland conveyors, the accumulation of frictional losses together with the forces required to either elevate or lower the load eventually builds to a point where the tension in the conveyor belt reaches a maximum allowable level for the belt's tension-carrying members, dictating the limit on the length of the conveyor. On conveyors that run on a substantial incline, the forces required to hold the belt and its load on the slope are the dominant forces that determine what distance of slope the conveyor can traverse before the tensile capacity of the belt is exceeded.

Further, in many of the major slope-conveyor projects to date, the flight lengths have been limited by the tensile strength of the available steel-cord conveyor belts. The usable strength of these belts is in turn limited by the fatigue strength of the splices between the dozens of discrete belt lengths that typically make up one endless belt. As the static strength of a steel cable belt increases, the fatigue strength of the splice (as a percentage of the static strength) decreases. So with current splicing technology, there is an inherent technical limit to the usable strength of steel cord belts. Therefore many major slope-belt projects have been designed with multiple conveyor flights, each flight utilizing the highest-strength steel-cord belt offered by the leading belt manufacturers. These flight length limitations imposed by belt strength have existed for as long as slope conveyor have been built, which is for roughly the last century.

Turning to solutions for the flight length limitations, it has been axiomatic in conveyor engineering that lower capital and operating costs are achieved when the required duty is met by selecting a smaller number of high-capacity components, rather than a larger number of lower-capacity components. So, for example, using two high-capacity drive trains would usually be more attractive than employing three lower-capacity drive trains. Similarly, a single conveyor that can handle 10,000 tons per hour is economically more attractive than two parallel conveyors that can handle 5,000 tons per hour each.

Another possible approach to increase the maximum achievable length of single conveyor flights is to provide discrete, relatively short belt-on-belt booster drives intermediate the head and tail pulleys of a conveyor in the form of secondary or internal belt conveyors that frictionally engage the underside of the main or carry belt. This type of arrangement is shown in FIG. 1. FIG. 2 shows a tension plot for the carry belt 102 of the conveyor system 100 of FIG. 1, where the tension in the carry belt 102 falls as the carry belt 102 passes over each booster section or booster drive 104. In practice, the length of each internal belt 106 is kept as short as possible so as not to incur excessive cost due to the duplication of belting. As such, the length of each booster drive 104 comprises only a small fraction of the overall length of the main conveyor 100. The length of the tension-transfer segments 108 shown in FIG. 2 would be much shorter and steeper in practice than suggested by FIG. 2.

The arrangement shown in FIG. 1 suffers from serious or fatal disadvantages. Excessive slack belt can be introduced by the booster section 104 over-driving the carry belt 102, which has led to catastrophic failures on long overland conveyors. In addition, it is known in the field that belt-on-belt drives can reliably transfer no more than one horsepower per longitudinal foot of belt-on-belt drive, which has made it counterintuitive to try and apply belt-on-belt drives to slope conveyors as the slope portions consume high rates of power. Furthermore, each booster unit 104, situated remotely from the main conveyor's head or tail locations 110, 112, requires a supply of power and a set of ancillary infrastructure, which poses challenges for inspection, maintenance and safety practices and adds substantially to the capital and operating costs of the conveyor system.

Another arrangement for applying belt-on-belt friction drives is shown in FIG. 3. However, this arrangement is used to separate the wearing elements of the conveyor system from the tension-carrying elements. The upper "carry" belt 202, which has a relatively low level of tensile capacity, is optimized to economically absorb the wear and impact involved in receiving and carrying the bulk material 204. The tension-carrying function is provided by the second or internal belt 206 arranged internally to the upper belt 202. The head pulley 208 of the upper belt 202 may be a non-driven pulley, or supply only a very small fraction of the total power required to drive the conveyor system 200. Almost all of the power required to drive the conveyor system 200 is applied through the pulley 210 of the inner belt 206. These types of conveyor systems do not enable the overall length of the conveyor to be any longer than a conventional single-belt system.

It is therefore desirable to provide a conveyor system, in particular an improved conveyor system implementing belt-on-belt drives, that addresses the above described problems and/or that offers improvements over existing belt-on-belt conveyor systems.

SUMMARY

Described herein are conveyor systems for conveying bulk materials and related control systems.

In some examples of the conveyor system, at least one portion of the conveyor system may traverse a continuous slope. The continuous slope may be sufficiently steep such that tensile forces associated with overcoming the effects of the continuous slope may be several times larger per unit length of run than tensile forces per unit length of run due to the main frictional resistance of the conveyor system. The conveyor system may include an external belt and an internal belt. The external belt may define a continuous loop. The continuous loop may traverse the entire route of the conveyor system and be configured to carry material load to be transported across the entire route. The internal belt may be positioned inside the continuous loop of the external belt and may traverse substantially the entire route of the conveyor system. An upper side of the internal belt may be configured to operably engage an underside of the external belt. The external belt and the internal belt may be further configured so that each belt has approximately an equal amount of belt tension as the other belt with respect to similar positions along substantially the entire length of the conveyor system.

In some examples, approximately more than half the length of the conveyor system may traverse the slope.

In some examples, a head pulley of the internal belt may be positioned close enough to a head pulley of the external belt so as to minimize the risk of excessive belt sag in a portion of the conveyor system between the two head pulleys.

In some examples, at least one of the external belt or the internal belt may carry equal shares of the conveyor tension accrued over the course of the slope.

In some examples, the external belt and the internal belt may have substantial longitudinal strength and substantially equal longitudinal elasticity.

In some examples, the external belt and the internal belt may have substantially similar allowable tension ratings.

In some examples, the external belt and the internal belt may include steel-cord belts.

In some examples, the external belt and the internal belt may have substantially similar width dimensions.

In some examples, the internal belt may be configured to transition from a substantially flat configuration to a substantially fully troughed configuration at a tail of the internal belt to operably engage the external belt. The internal belt may be configured to transition from the substantially fully troughed configuration to the substantially flat configuration at a head of the internal belt to be operably disengaged from the external belt.

In some examples, a trough of the external belt may be configured to descend onto a trough of the internal belt.

In some examples, the external belt may form into a trough with steeper sides proximate to the area of engagement.

In some examples, the conveyor system may further include a plurality of carry idlers. The spacing between the carry idlers adjacent to the area of engagement may be greater than the spacing between the other carry idlers.

In some examples, the conveyor system may further include a plurality of carry idlers. The spacing between the carry idlers adjacent to the area of engagement may be less than the spacing between the other carry idlers.

In some examples, the conveyor system may further include a support mechanism. The support mechanism may facilitate at least one transition length of engagement or disengagement of the external belt and the internal belt. The support mechanism may include at least one of air-support panels, slider pads, or small-diameter idlers.

In some examples, the support mechanism may be supported from above such that at least portions of lateral trough walls of the internal belt may be in close proximity to at least portions of lateral trough walls of the external belt.

In some examples, the external belt may be flattened to facilitate engaging and/or disengaging the internal belt.

In some examples, the conveyor system may further include a cover belt configured to form an inverted trough to contain a material load on the flattened external belt.

In some examples, the conveyor system may further include a control system. The external belt may include a set of drive pulleys. The internal belt may include a set of drive pulleys. The control system may control the torque of at least one of the set of drive pulleys of the external belt or the set of drive pulleys of the internal belt to achieve substantially equal load sharing by each belt.

In some examples, a drive of the inner belt may be at least partially controlled by reference to the tension load supported by a head pulley of the external belt.

In some examples, a maximum tension carried by the internal belt may be equal to a maximum tension carried by the external belt.

BRIEF DESCRIPTION OF THE DRAWINGS

FIG. 4 shows a schematic elevation view of a first example of a conveyor system.

FIG. 5 shows an enlarged schematic view of the head portion of the conveyor system shown in FIG. 4 at detail A.

FIG. 6 shows an enlarged schematic view of the tail portion of the conveyor system shown in FIG. 4 at detail B.

DETAILED DESCRIPTION

Figure 1:
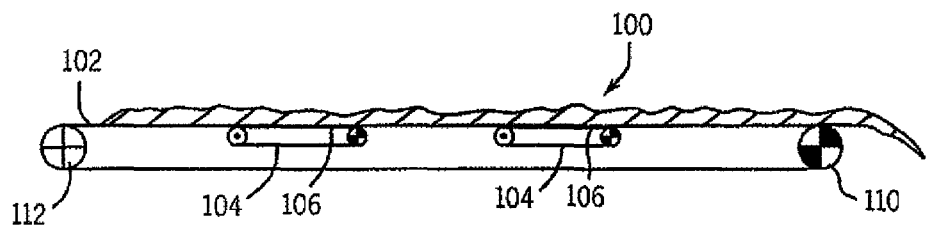
FIG. 1 shows a schematic elevation view of a belt-on-belt conveyor system.
Figure 2:
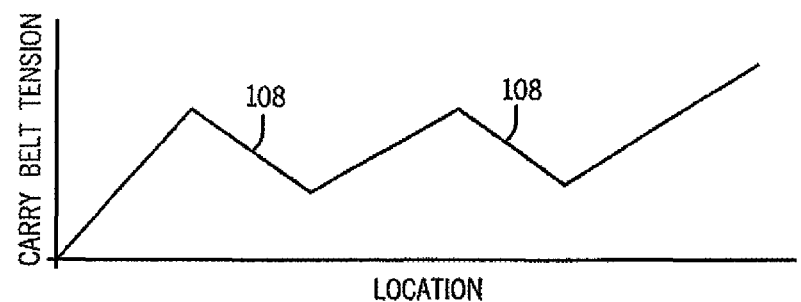
FIG. 2 shows a graphic representation of tension for the carry belt of the conveyor system shown in FIG. 1.

Described herein are conveyor systems for conveying bulk materials and methods of implementing the systems. The conveyor systems may include an external belt and an internal belt. Both the external and internal belts may span over terrain with one or more sloped sections. The one or more sloped sections may be sufficiently steep such that tensile forces associated with overcoming the effects of the continuous slope may be several times greater per unit length of run than tensile forces per unit length of run due to main frictional resistance of the conveyor system. Further, the internal belt may be provided to run over substantially the same length of the run as the external belt. The external and internal belts may be configured to approximately equally share the tension that is accrued over the length of the run, thereby relieving the external belt from all accruing all the tension that must be carried by the conveyor belts. The external belt and the internal belt may have substantial longitudinal strength and similar width dimensions. Also described herein are mechanisms that facilitate the transitioning of the internal belt into the carry trough of the external belt. By using the conveyor systems described herein, a longer conveying distance with one or more sloped sections, which would usually require multiple conventionally constructed conveyors each configured with high tension rating belts, may be traversed with a single conveyor system using conventional tension rating external and/or internal belts. The conveyor systems may also eliminate belt-to-belt transfer equipment, which are often used in multi-conveyor systems. The conveyor system may be utilized for conveying material either uphill in the sloped sections or downhill in the sloped sections.

With reference to FIGS. 4-6, a first embodiment of the conveyor system 300 is described. Almost the entire length of the conveyor system 300 may run on a substantial incline for transporting materials from one location to a different location, such as from a lower level location to a higher level location. The conveyor system 300 may include an external belt 302 and an internal belt 304. The internal belt 304 may be positioned to reside inside the continuous loop formed by the external belt 302 and to underlie a majority of the length of the external belt 302. At a contacting interface 306 between an underside of the external belt 302 and the top side of the internal belt 304, frictional shear between the two surfaces may be utilized to transfer tension from one belt into the other belt.

The external belt 302 may include a head pulley 308 and a tail pulley 310. The head pulley 308, located proximate to the higher level location, may be powered, and thus may serve as the drive pulley. However, in some embodiments the system may include a separate drive pulley 309. The tail pulley 310, located proximate to the lower level location, may or may not be powered. The head pulley 308 and the tail pulley 310 may be configured to move/rotate the external belt 302 to carry materials 312 from the lower level location to the high level location. As such, the external belt 302 may also be referred to as the carry belt 302.

The internal belt 304 may include an internal belt head pulley 314, which may be powered to serve as the drive pulley, and an internal belt tail pulley 316, which may or may not be powered. Like the external belt 302 that may run the entire length of the conveyor system 300, the internal belt 304 may be also run approximately the entire length of the conveyor system. Accordingly, the internal belt tail pulley 316 may be positioned proximate to the external belt tail pulley, and the internal belt head pulley 314 may be positioned proximate to the head pulley 308 of the external belt 302. In some embodiments, the internal belt may include a separate drive pulley 315.

The conveyor system 300 may be configured in a manner such that during operation, the upper side of the internal belt 304 may be configured to transition from a substantially flat configuration to a substantially fully troughed configuration at the tail of the internal belt 304 to operably engage the underside of the external belt 302. The upper side of the internal belt 304 may be further configured to transition from the substantially fully troughed configuration to the substantially flat configuration at the head of the internal belt 304 to operably disengage the internal belt from the underside of the external belt 302. When the internal belt 304 engages the external belt 302, the internal belt 304 may share the tension load with the external belt 302, and thus relieve the head pulley 308 of a significant portion of the tension that the load material 312 may impart to the external belt 302.

In some embodiments, the external belt 302 and the internal belt 304 may be provided with separate return paths from their head pulleys 308, 314 to their respective tail pulleys 310, 316. Such separate return paths may be achieved by providing two separate levels of return idlers. The separate return idler paths allow the tensions in the two return belt sections to distribute themselves in a similar manner to a single belt system.

In some embodiments, a take-up pulley may be positioned just downstream of the last drive pulley in the drive set for each belt 302, 304. Each of these take-up pulleys may have a short-stroke. The short-stroke may be no greater than one take-up pulley diameter and/or may be approximately the same as any anticipated belt length inequalities between the belts 302, 304. The tensions in these take-ups may be set at the minimum acceptable T2 tension for the drive pulleys under full load. Under nominal T2 conditions, the supplemental take-ups would be inactive by resting hard-up against a rigid stop. The take-ups would only move off their rigid stops and become active if the local T2 tension fell to some pre-determined minimum level. In other words, the take-ups would be inactive against their respective hard stops for most conveyor conditions but would move actively to take up excess T2 length if such a condition arose.

In some embodiments, the tail pulley 316 for the inner belt 304 may have a somewhat smaller diameter than the tail pulley 310 of the carry belt 302. Such a configuration may help to provide space for a second take-up carriage within the carry and return belt runs. A winch or counterweight for the inner belt tail pulley serving also as a take-up pulley 316 may be mounted to the rear of the outer belt tail pulley 310, or else off to the side. In some cases, a single winch or counterweight may be used to tension both tail pulleys 310, 316, further reducing the space requirement at the tails of the belts 302, 304. In accordance with various embodiments, one or both tail pulleys 310, 316 may be operable as a tensioner pulley. For example, the tensioner pulley (which in some embodiments can be tail pulley 316) for the inner belt 304 and the tensioner pulley (which in some embodiments can be tail pulley 310) for the outer belt may be different pulleys.

To achieve the tension sharing function along the length of the conveyor, in some examples, the internal belt 304 may be configured to approximately match the external belt 302 in both its width and in its tensile capacity per unit width. Moreover, both the external belt 302 and the internal belt 304 may have substantial longitudinal strength, so that each may share a pre-determined portion of the tension developed over the length of the entire route. In a preferred embodiment, the external belt 302 and the internal belt 304 equally share the tension load.

Figure 3:
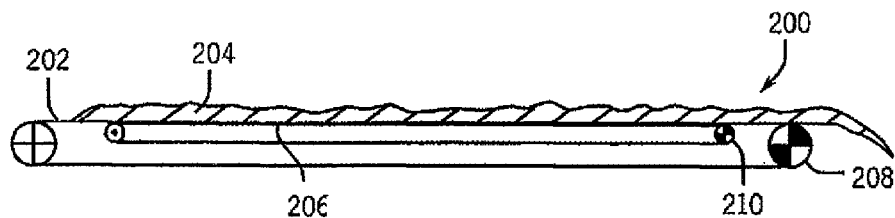
FIG. 3 shows a schematic elevation view of another belt-on-belt conveyor system.

In some embodiments, the external belt 302 and the internal belt 304 may have substantially similar allowable tension ratings. Both the external and internal belts 302, 304 may be high-strength steel-cord or steel cable belts in some embodiments. This is in contrast to the internal drive belt 206 shown in FIG. 3, where the internal belt 206 is configured to be the primary tension-carrying element over most or all of the conveyor length, and the external belt 202 is configured as a low-cost, low-strength consumable belt. This is also in contrast to the short belt-on-belt drives shown in FIG. 1 where the internal belt 106, though as wide as the external belt 102, is often a fabric-carcass belt with sufficient flexibility to allow transition geometries that are not possible with steel-cord belts. Further, in contrast to the other belt-on-belt conveyors shown in FIGS. 1 and 3, because the internal and external belts 302, 304 are similar in length and construction, the internal belt 304 may be advantageously swapped with the external belt 302 when the top cover of the external belt 302 is worn out.

In some examples, the drive (or drive set) for the internal belt 304 may be further configured to provide a similar amount of power as provided by the drive (or drive set) of the external belt 302. In some examples, when the entire length of the conveyor system 300 is carrying its nominal design load, the maximum steady-state tension in the internal belt 304 may be configured to approximate the maximum steady-state tension developed in the external belt 302.

Various other techniques may further be utilized to facilitate achieving approximately equal tensions in the external and internal belts 302, 304 along the length of the conveyor at different load conditions. For example, at the head of the conveyor, the drives for each belt 302, 304 may be controlled to inject essentially the same tension into each belt 302, 304 by means of motor torque control. To eliminate inaccuracies due to motor torque/speed curve irregularities or due to wear of pulley lagging or belt covers, the tensions in each belt 302, 304 can be measured by load cells under each head pulley 308, 314, and that signal can be used to control torque input. In various embodiments, the load cells may be additionally or alternatively located in drive pulleys (e.g. 309, 315).

As another example, both belts 302, 304 may have approximately the same longitudinal stiffness so that significant differential elongation in response to load may be minimized. Yet further, the frictional interface between the belts 302, 304 is high enough that—for modest local inequalities of belt tension—each belt 302, 304 draws the other along with it to achieve tension equilibrium.

The belts 302, 304 may preferably be mated before the loading point so that each belt 302, 304 can immediately start to carry an equal share of the tension load. Then, as the belts 302, 304 traverse a slope, they are called on by gravity and frictional resistance to add tension at the same rate so that at any particular location along the conveyor, neither belt 302, 304 is significantly more loaded than the other. An additional benefit of mating the belts 302, 304 prior to the loading point is that the double layer of belt 302, 304 at the loading point provides more wall stability, penetration resistance, and cushioning for material loads deposited onto the external belt 302. Both belts 302, 304 may also be substantially the same length, so that the peak tension reached in the two belts 302, 304 at their head pulleys 308, 314 is substantially the same.

Additional methods and/or mechanisms may be implemented (1) to prevent slack belt accumulating between the drive pulley 315 of the internal belt 304 and the drive pulley 309 of the external belt 302, and (2) to facilitate transitioning and mating between the internal and external belts 302, 304.

To prevent slack belt accumulating forward of the drive pulley 315 of the internal belt 304, especially for steep conveyors, in some examples, closely-spaced carry idlers may be provided in the segment between the head pulley 314 of the internal belt 304 and the head pulley 308 of the external belt 302 to give improved support to any slack belt that does arise. In some examples, a variable-frequency drive ("VFD") control system may be used to keep the speeds of the drive pulleys 309, 315 for the internal and external belts 302, 304 sufficiently close to each other. However, even without closely-spaced carry idlers or VFD control system, the risk of the booster drive pushing slack belt ahead of it and causing excessive sag may be negligible by locating the head pulley 314 of the internal belt 304 close to the head pulley 308 of the external belt 302. This is because the short distance set between the internal belt head pulley 314 and the external belt head pulley 308 may facilitate behavior such that the external belt 302 is pulled over the external belt head pulley 308 before too much "pushed forward" belt accumulates between the head pulleys 308, 314. In addition, the return portion of the external belt 302 lying on the downhill slope may also provide a constant and substantial tension for the external drive pulley 309 in the downhill direction, thus tending to accelerate the pulley 309 if tension in the uphill direction drops, thus pulling the "extra" belt, if any, over the external drive pulley 309.

To provide a transition or a transition length for the inner belt from its flattened profile at a tail pulley of the inner belt to the troughed profile in contact with and supporting the troughed external belt, several mechanisms may be implemented. In some examples, such mechanisms may be required to allow gradual transitions of the external and/or internal belts between a flattened profile and a troughed profile when both the external and internal conveyor belts may be high-strength steel-cord belts. Such mechanisms may also provide sufficient support for the central and lateral portions of the troughed external belt to contain the carried material in a troughed belt, even while the internal belt is brought into contact with the underside of the external belt. Similar mechanisms may also be provided near the head pulley of the internal belt, where separation of the two belts may be facilitated.

Figure 7A:
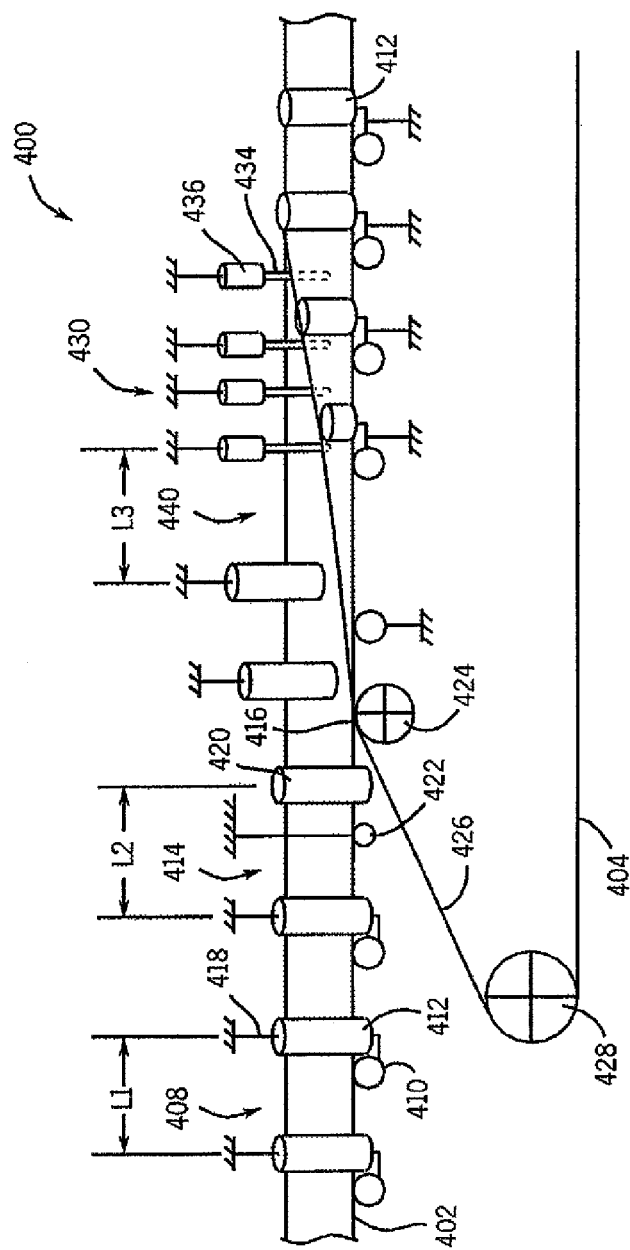
FIGS. 7a, 7b, 7c, 7c', 7d, 7d', 7e, and 7f illustrate a first example of a configuration that may facilitate engagement and disengagement of an external belt and an internal belt of the conveyor systems as described herein.
Figure 7B:
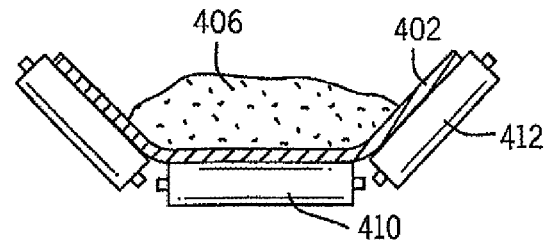
Figure 7C:
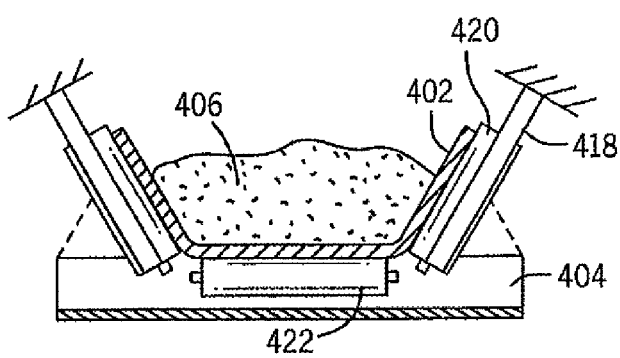
Figure 7C:
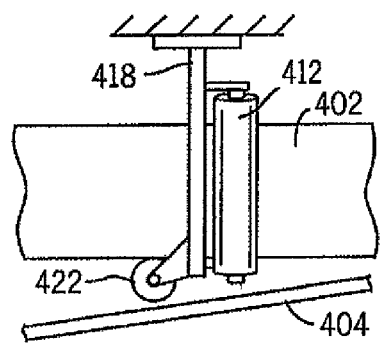

With reference to FIGS. 7a, 7b, 7c, 7c', 7d, 7d', 7e and 7f, a first example of a configuration that may facilitate the engagement and disengagement of the external and the internal belts with each other is described. FIG. 7a shows a lateral elevation view of a transition portion of a conveyor system 400 where the trough of the internal belt 404 may rise onto the trough of the external belt 402 so that the external belt 402 and the internal belt 404 may engage each other. The internal belt lateral trough portions may support the external belt lateral trough portions. FIGS. 7b, 7c, 7d, and 7e show transverse section views of the conveyor system 400 at different locations along the transition portion. A similar arrangement may be provided in another transition portion of the conveyor system 400 where the external belt 402 and the internal belt 404 may disengage each other.

FIG. 7b shows a transverse section of the external belt 402 carrying a material load 406 at a location upstream of the transition region (the internal belt 404 is omitted from this view). At this location, the external belt 402 may be supported by a set of carry idlers. The set of carry idlers may be a set of standard idlers that may include a central idler 410 and at least two wing or lateral idlers 412. The wing idlers 412 may support the trough at a first angle, such as a standard troughing angle, for the carry side of the conveyor 400.

FIG. 7c shows a transverse section of the external belt 402 and the converging internal belt 404 at a location 414 as they approach the point 416 (FIG. 7a) where the two belts 402, 404 will come into contact. FIG. 7c' is a lateral elevation of the same idler station, showing a short length of the assembly. Leading up to this idler station, the wing idlers 412 may be configured to carry the external belt 402 in a steeper trough than at the preceding standard idler stations. In some examples, the wing idlers 412 may be mounted to brackets 418 that may be supported from above. Mounting the wing idlers 412 to the brackets 418 supported from above may facilitate the still-flattened internal belt 404 converging on the underside of the external belt 402. In addition, the wing idlers 420 used at this station may be of a smaller running surface diameter than those employed at a standard idler station. Furthermore, in order to allow convergence between the two belts 402, 404 while still providing vertical support for the external belt 402 and its load 406, the central idler 422 of each idler set in this area may be configured to have a smaller running surface diameter than that used in standard central idlers 410.

Figure 7D:
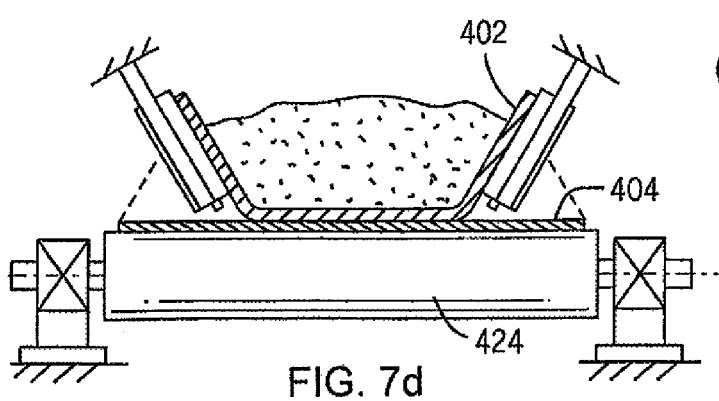
Figure 7D:
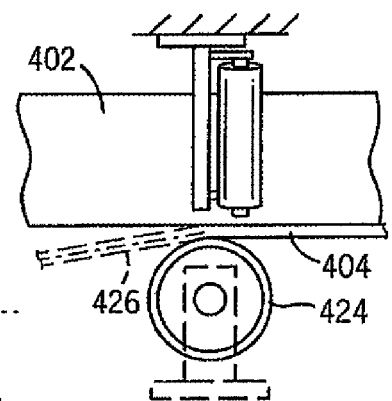

FIG. 7d shows, in transverse section, a station at the point 416 where the still-flattened internal belt 404 has been brought up to mate with the underside of the external belt 402. The internal belt 404 at this station may be deflected and supported by a bend pulley 424. In FIG. 7d', the path 426 of the internal belt 404 in coming off its tail pulley 428 is illustrated by the dashed outline.

Figure 7E:
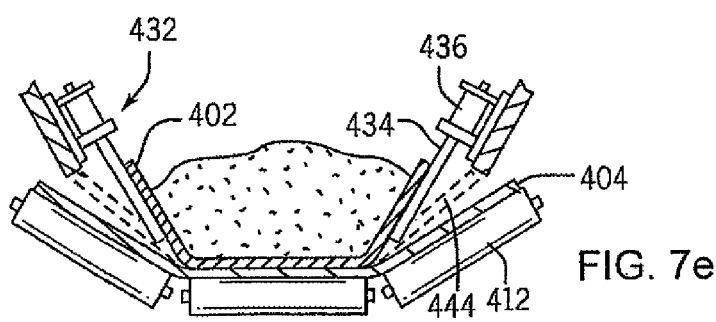

FIG. 7e shows an idler station at a location 430 (FIG. 7a) yet further along the transition portion, where now the lateral portions of the external belt 402 may be supported by small-diameter wing idlers 432, and the lateral portions of the internal belt 404 may be carried closer to the mating position by wing idlers 412, which may be standard-diameter idlers. Each of the small-diameter wing idlers 432 may include a belt-supporting idler cylinder 434. The belt-supporting idler cylinder 434 may have a very much smaller diameter than a standard idler. In order to allow a close convergence of the lateral portions of the internal belt 404, the idler cylinder 434 may be cantilevered from a mounting boss assembly 436, which may in turn be supported from an overhead bracket. To help ensure that the small-diameter idlers 432 have enough strength for their duty, such idlers may be closely spaced to reduce the load on any individual idler cylinder 434. In some examples, a longer idler spacing may be allowed at some points in the transition/mating segment. Additional local design details may be implemented to address any potential issues otherwise associated with longer idler spacing.

Figure 7F:
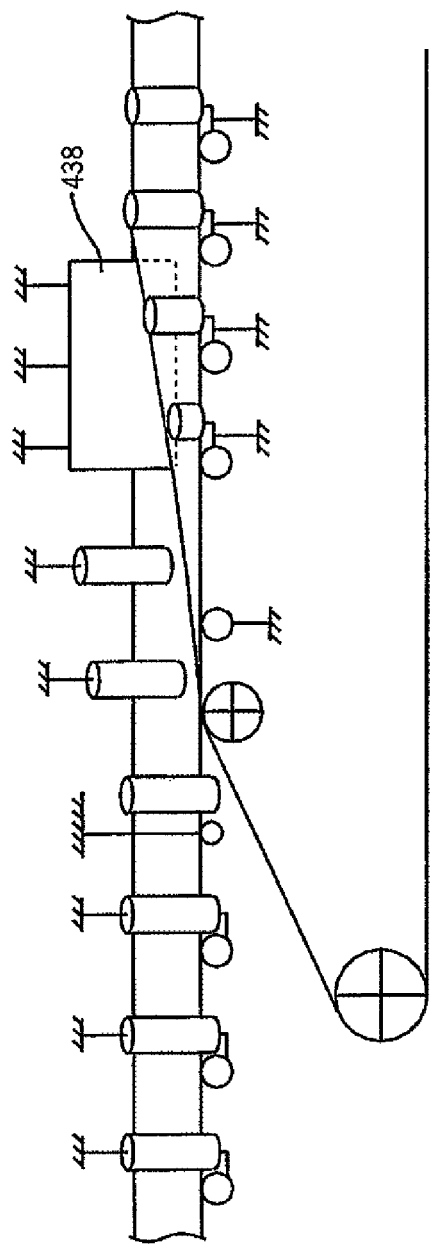

In order to reduce impact loads on the cantilevered idler cylinder 434, the idler boss assembly 436 may be provided with a resilient suspension mechanism that may allow the idler cylinder 434 to deflect out of the path of protrusions from the under-surface of the external belt 402. With reference to FIG. 7f, an air-slider panel or a slider pad 438 may be used to support the lateral walls of the external belt 402 where the lateral walls of the two belts are converging on each other, and the lateral space for the belt supporting mechanism may be limited. The air-slider panel or slider pad 438 may also minimize local belt sag.

FIG. 7e also shows by the dashed lines the ultimate trough profile 444 of the external belt 402 when the lateral portions of the external belt 402 and internal belt 404 are mated and the external belt 402 may return to its standard troughing angle. From this it may be seen that—for both the external belt 402 and the internal belt 404—only a relatively small amount of change in the angles at which they are supported may remain to be effected before the lateral portions of the two belts 402, 404 are mated. Since the corresponding belt-length for the remaining transition may be relatively short, the lateral portions of the external belt 402 may hang unsupported by any wing idlers as the steepness of the carry trough is relaxed, until the point where they may be supported by the lateral portions of the converging internal belt 404.

With reference again to FIG. 7a, at the location 408 before the external belt 402 and the internal belt 404 may engage, the carry idler sets may be spaced at a predetermined distance L1 from each other. The distance L1 may be selected to optimize the economics and/or operation of the overall conveyor system. The distance L1 may be selected based on any other suitable consideration. In the transition region, it may be convenient to change the spacing between idler sets in order to facilitate the engagement of the external belt 402 and the internal belt 404. In some examples, at the location 414 where the external belt 402 and the internal belt 404 approach the point 416 where the two belts may come into contact and/or at the location 440 where the partially troughed lateral portions of the internal belt 404 further approaches the lateral portions of the external belt 402, the longitudinal spacing L2, L3 between the wing idlers may be greater than the longitudinal spacing L1 at location 408. Such greater spacing may allow sufficient space for the approach of the internal belt 404 towards the external belt 402 without idlers interfering in the narrowing space between the two belts.

Figure 8A:
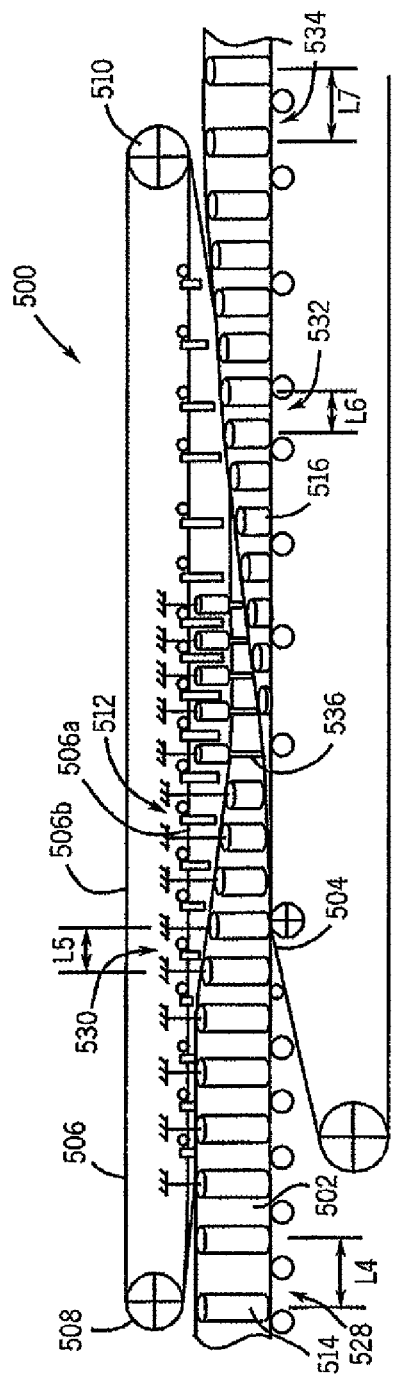
FIGS. 8a, 8b, 8c, 8d, and 8e illustrate a second example of a configuration that may facilitate engagement and disengagement of an external belt and an internal belt of the conveyor systems as described herein.
Figure 8B:
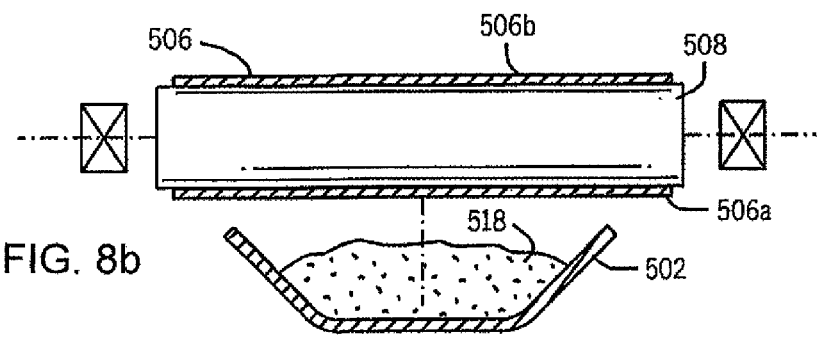
Figure 8C:
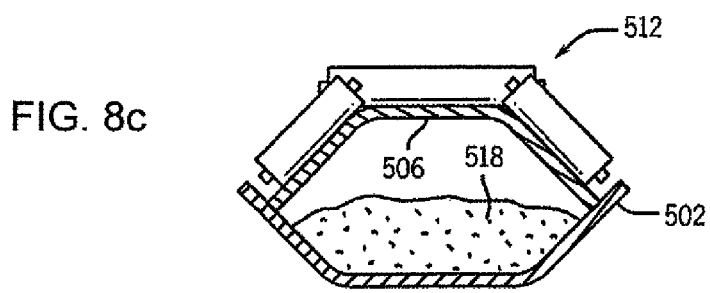
Figure 8D:
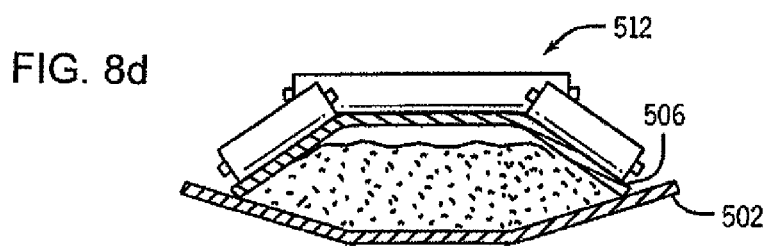

With reference to FIGS. 8a, 8b, 8c, 8d, and 8e, a second example of a configuration that may facilitate the engagement and disengagement of the external and the internal belts with each other is described. FIG. 8a shows a lateral elevation view of a transition portion of a conveyor system 500 where the external belt 502 and the internal belt 504 may engage each other. FIGS. 8b, 8c, and 8d show transverse section views of the conveyor system 500 at different locations along the transition portion. Note that the idlers supporting the underside of the external belt 502 and the converging internal belt 504 have been omitted from FIGS. 8b, 8c, and 8d.

With reference to FIG. 8a, an endless cover belt 506 may be used to contain the material carried on the external belt 502 so that the external belt 502 may be flattened in the transition region to be more easily mated with the internal belt 504. The cover belt 506 may be held in tension above the external belt 502 by a tail bend pulley 508 and a head bend pulley 510. The cover belt 506 may include a "carry" portion 506a facing the material load and a "return" portion 506b. The "carry" portion 506a may be guided by inverted idler sets 512 so as to form a constraining tunnel over the material carried by the external belt 502, while the trough of the external belt 502 may be guided into a shallower profile by its lateral idlers 514. The internal belt 504 may be guided by lateral idlers 516 into a partially-troughed form so as to engage the external belt 502 at a point where the internal and external belts 502, 504 are troughed to a similar degree. As the engaged pair proceeds further downstream, the lateral idlers 516 supporting the internal belt 504 may gradually return the pair of belts to the degree of troughing designed for the main length of the conveyor's run. During this transition, the inverted idler sets 512 may guide the cover belt 506 into a progressively steeper trough so as to continue to contain the material load carried on the external belt.

FIG. 8b shows a transverse sectional view of the external conveyor belt 502 carrying its load of material 518 at the location of the tail bend pulley 508 of the cover belt 506. The location of the tail bend pulley 508 may be at a predetermined distance upstream from the mating zone between the external belt 502 and the internal belt 504. At the head end of the cover belt 506, the head bend pulley 510 may be mounted above the external belt 502 in a similar manner to provide for the return of the cover belt 506. The cover belt 506 may be tensioned between its tail and head bend pulleys 508, 510 with an appropriate degree of tension to facilitate the forming an inverted trough of the cover belt 506. In some examples, the cover belt 506 may be driven by its contact with the external belt (described below) so that the tail and head bend pulleys 508, 510 of the cover belt 506 may be undriven pulleys.

FIG. 8c shows an idler station at a predetermined distance downstream from the station of FIG. 8b. At this station, the cover belt 506 may be deflected downwards and formed into an inverted trough by a series of idler sets 512, so that the edges of the cover belt 506 may rest against the exposed free edges of the carry surface of the external belt 502. The cover belt 506 may be constructed to allow a short transition zone between a bend pulley and a fully-troughed section of the cover belt 506. Therefore, a fabric belt with a nylon or equivalent carcass may be used. Any other suitable carcass may be contemplated. Also, the cover belt 506 may have sufficient transverse stiffness so that the cover belt 506 may support itself in an inverted trough when resting on its edges and appropriately guided by idlers 512 on its convex or outer surface.

FIG. 8d shows another idler station, yet further downstream from that of FIG. 8c. At this location, the idlers 514 supporting the external belt 502 may be transitioned to a configuration that may allow the trough of the external belt 502 to be shallower than before. At the same time, the idler sets 512 may be configured to guide the cover belt 506 in such a way as to maintain a contacting seal between the edge of the cover belt 506 and the surface of the external belt 502. As the trough of the external belt 502 has been made shallower, the lateral walls of the cover belt 506 may take over the duty of containing the material load and ensuring that the material load does not spill.

As the trough of the external belt 502 becomes flattened, it may become easier to transition the internal belt 504 to mate with the underside of the external belt 502, which may not require special idler configurations. Once the internal belt 504 and the external belt 502 are thus mated, the subsequent carry idler sets 516 may guide the mated internal and external belt pair back into the fully-troughed profile, while the cover belt idler sets 512 may allow the cover belt 506 to return to a tunnel form as shown in FIG. 7c, and thence released to become flattened for bending around the head bend pulley 510.

Further downstream from the head bend pulley 510 of the cover belt 506, the mated external and internal belts 502, 504 may continue their run with belts formed in the conveyor's standard trough, until the point where the internal and external belts 502, 504 may separate near the head of the conveyor 500. If the distance between the head pulley of the internal belt 504 and that of the external belt 502 is sufficiently large that continued lateral containment of the carried material must be maintained, then a cover belt arrangement similar to the cover belt 506 described above may be installed at the head end of the conveyor system 500. In that position, the cover belt may be applied to contain the material on the external belt 502 while the external belt 502 may be flattened to facilitate separation of the external belt 502 and the internal belt 504. The cover belt may then further contain the material until the external belt may be re-troughed for the remainder of its run to its head pulley.

The series of idler sets 512 for guiding the cover belt 506 may be configured with a close longitudinal spacing in order to properly form and guide the cover belt 506. In the zone where the edges of the cover belt 506 must contain the carried material 518, a series of idler sets supporting the external belt 502 may also be configured with a close longitudinal spacing, in order to minimize the belt sag between idlers and therefore minimize any gap between the edge of the cover belt 506 and the surface of the external belt 502. In some examples, as an alternative to close idler spacing, slider pads may be used to minimize local sag. In some examples, the cover belt 506 may be configured with structures that may help to ensure a good seal or contact between the cover belt 506 and the external belt 502.

Figure 8E:
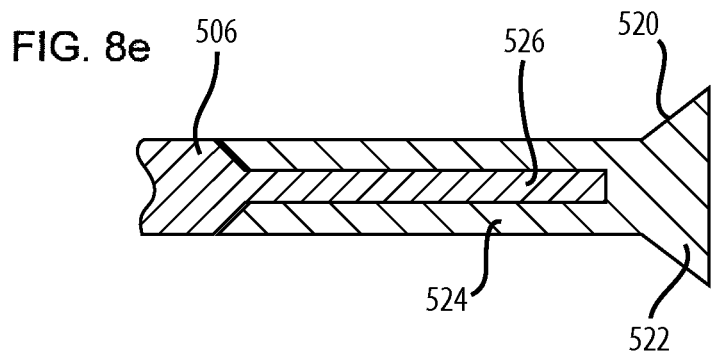

FIG. 8e shows a transverse sectional view of an edge portion of the cover belt 506. An edge member 520, such as a seal or contact member, may be provided along a portion, or an entirety, of each of the two longitudinal edges of the cover belt 506. The edge member 520 may include a foot portion 522 and an attachment portion 524 for joining the foot portion 522 to the cover belt 506. The attachment portion 524 may be joined to the main carcass of the cover belt 506 by a lap joint or any other suitable attachment method. In some examples, the attachment portion 524 may have a C or reverse C shape cross section. The thickness of the attachment portion 524 (i.e., the height of the C or reverse C shape cross section) may be configured to be substantially the same as or similar to the thickness of the cover belt 506. The open end of the C or reverse C shape of the attachment portion 524 may be configured to receive a portion of the main carcass 526 of the cover belt 506 and joined thereto by adhesive, gluing, or any suitable method. The foot portion 522 of the edge member 520 may have a dovetail cross section with the narrower side joined to the attachment portion 524 and the wider portion forming a greater contact surface with the external belt 502. The attachment portion 524 and/or the foot portion 522 may have any other suitable cross section shapes.

The edge member 520 may be formed from a relatively soft elastomer or similar material, so as to conform to any irregularities in the surface against which it may rest and to ensure a good seal or contact therebetween. The edge member 520 may be further configured to have sufficient flexibility to allow the contacting surface of the foot portion 522 to remain pressed against the surface of the external belt 502, even when each lateral portion of the cover belt 506 may not be held perpendicularly to the plane of each edge land of the external belt 502. This flexibility may also allow the foot portion 522 to be deflected without damage when the cover belt 506 may pass around a bend pulley.

With reference again to FIG. 8a, at a typical location 528 upstream of the mating area, the carry idler sets 514 may be spaced at a predetermined distance L4 from each other. The distance L4 may be selected to optimize the economics and/or operation of the overall conveyor system. The distance L4 may be selected based on any other suitable consideration. In the mating region, to facilitate a close engagement of the edge of the cover belt 506 and the surface of the external belt 502, it may be desirable to reduce the spacing between lateral idler sets 514 in order to prevent undulation of the walls of the external belt 502. For example, at location 530 and location 532 shown in FIG. 8a where the edges of the cover belt 506 must contain the material load, the respective longitudinal spacing L5, L6 between the wing idlers may be smaller than the longitudinal spacing L4 at location 528 or the longitudinal spacing L7 at location 534. In order to further support the external belt 502 without significant undulations in the area where the lateral walls of the internal and external belts 502, 504 are closely approaching each other, idlers with cantilevered small-diameter running cylinders 536 may be installed. Similar to the idler cylinders as described with respect to the example shown in FIG. 7a, the small-diameter running cylinders 536 may be conveniently supported from above.

For the conveyor systems as described herein, a longer transition length may be implemented to allow the rates of transition of the external and/or internal belts in the mating segment to be very gentle. This is because increased transition length may not increase the overall length of the conveyor system as described herein. In other words, at the transition there may be little penalty for a longer transition length. This is in contrast to the case of a conventional transition at the head or tail of a conveyor, where the transition length is usually kept as short as possible in order to minimize the overall length of the conveyor or to reduce the likelihood of material spillage.

There are many advantages of the conveyor systems described herein. First, there is negligible risk of the internal belt pushing slack external belt ahead of it and causing excessive sag. This is partly due to the proximity between the drive pulleys. Additionally, the conveyor belt system overcomes the power consumption limitation regarding the belt-on-belt conveyor shown in FIG. 1 (i.e., the industry rule of thumb of one horsepower of power transfer per longitudinal foot regarding the power that can be input to the carry belt by a belt-on-belt drive) because under most full-load conditions, there is sufficient interfacial friction available to transfer the load from the external belt to the internal belt. Furthermore, design of the load transfer between the external belt and the internal belt may rely on much higher coefficients of friction than can be assumed in the short booster drives of FIG. 1. This is because the great length of contact between the two belts allows load shedding from segments that may be wet and slippery to lengths with higher-than-average coefficients of friction.

Moreover, the internal belt may be advantageously implemented in such a way that the internal belt may equally share the tension load. In some examples, the tension needed to carry the material load and the weight of the external belt on the slope, and a portion of the main frictional resistance accrued by the external belt in riding on the internal belt, may be transferred to the internal belt such that both belts carry approximately the same tension load. This is in contrast to the booster belts 106 shown in FIG. 1, which are relatively short and configured to primarily relieve tension developed elsewhere along the route of the external belt 102 rather than share the tension load accrued along the length of the conveyor. As such, the strength requirement for the external belt may be reduced.

In addition to tension reduction and run-length increase, the configuration of the conveyor system may also overcome issues associated with creep between the external and internal belts due to differential elongation, which may be problematic for conventional belt-on-belt drives. This is primarily because the belts are preferably of the same longitudinal stiffness and the belts accrue tension at the same rate. Therefore, elongation of the belts is equivalent along the lengths of the belts. This is also because the steel-cord belts preferably used in these conveyor systems are much stiffer than the fabric belts traditionally used in belt-on-belt drives. As such, for the same tension differentials, there is much less differential elongation between the internal and external belts of the conveyor systems. In addition, the interface between the two belts will usually remain relatively clean, thus minimizing the amount of wear that might result from creep. Moreover, the dynamic movement of the belts over the idlers may continuously provide opportunities for local release and relaxation of different tensions between the two belts.

Unloading of the conveyor, short of manual unloading, in case of failure of either the master or follower drive set will now be discussed.

If drive of the internal belt fails while the external belt is fully loaded, the external belt may need to carry twice the rated tension if the internal belt extends over the conveyor's length, at least until the conveyor is partially unloaded. Since the external belt is configured to have a static factor of safety of at least 2.5 against tensile failure of the belt or splice, there is enough available belt strength in the external belt to safely unload the conveyor. However, the unloading may be gradually done at a reduced speed to allow for the external belt drive to have sufficient torque and cooling to creep the belt upwards for at least short periods. For the case where the internal belt spans approximately the entire length of the conveyor, the master or external belt drive may need to run slowly and apply about twice the nominal torque that is applied when both the master drive and the follower or internal belt drive are operating normally.

If the master drive fails when the external belt is fully loaded, the effective average coefficient of friction between the external and internal belts may still, or even be very likely to, have sufficient capacity to prevent the internal belt from slipping against the external belt, even when twice the nominal working tension is being transferred into the internal belt. Similar to the static factor of safety for the external belt, the internal belt is also configured to have enough static capacity to safely support the extra load. As such, for short periods, the follower drive is configured to have the capacity to exert twice its nominal full load torque to allow the conveyor to be emptied as discussed above with respect to the master drive in case of the follower drive's failure.

The external belt and the internal belt may have substantial longitudinal strength and/or substantially similar allowable tension ratings. The external belts and the internal belts may include steel-cord belts or other suitable belts. The external belts and the internal belts may have substantially similar width dimensions or may have different width dimensions. The unloading mechanisms and related methods thereof described with respect to the first example of the conveyor system may also be used with other conveyor systems.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A long run conveyor system, at least a portion of the long run conveyor system traversing a slope sufficiently steep such that tensile force associated with overcoming the effects of the slope is greater per unit length than tensile forces per unit length of run due to main frictional resistance of the conveyor system, the conveyor system comprising:

an external belt defining a continuous loop, the continuous loop traversing the entire route of the conveyor system and configured to carry a material load to be transported across the entire route;

an internal belt positioned inside the continuous loop of the external belt and traversing substantially the entire route of the conveyor system, an upper side of the internal belt operably engaging an underside of the external belt, the external belt and the internal belt each having an approximately equal amount of belt tension;

at least a first drive pulley comprising a first set of drive pulleys, the at least a first drive pulley being in operative communication with the external belt and configured to drive the external belt;

at least a second drive pulley comprising a second set of drive pulleys, the at least a second drive pulley being in operative communication with the internal belt and configured to drive the internal belt; and a control system that controls a torque of at least one of the first set of drive pulleys or the second set of drive pulleys to achieve substantially equal load sharing by each of the external and internal belt.

2. The conveyor system of claim 1, wherein approximately more than half the length of the external belt traverses a slope having a steepness such that the belt tension accrued due to the slope per unit length of run is larger than the tension accrued due to friction.

3. The conveyor system of claim 1, further comprising:
a first head pulley in operative communication with the internal belt;
a second head pulley in operative communication with the external belt, wherein the first head pulley is positioned close enough to the second head pulley so as to substantially prevent belt sag in a portion of the external belt between the first and second head pulleys.

4. The conveyor system of claim 1, wherein the external belt and the internal belt have substantially equal longitudinal strength so as to enable the external belt and the internal belt to carry approximately equal longitudinal tensions.

5. The conveyor system of claim 1, wherein the external belt and the internal belt have substantially similar allowable tension ratings.

6. The conveyor system of claim 1, wherein the external belt and the internal belt comprise steel-cord belts.

7. The conveyor system of claim 1, wherein the external belt and the internal belt have substantially similar width dimensions.

8. The conveyor system of claim 1, wherein the internal belt is configured to at least one of transition from a substantially flat configuration to a substantially fully troughed configuration at a tail of the internal belt to operably engage the external belt, or to transition from the substantially fully troughed configuration to the substantially flat configuration at a head of the internal belt to operably disengage the external belt.

9. The conveyor system of claim 8, wherein a trough of the internal belt is adapted to and supports a trough of the external belt.

10. The conveyor system of claim 9, wherein a center of the trough of the internal belt contacts the center of the trough of the external belt.

11. The conveyor system of claim 9, wherein lateral sides of the trough of the internal belt extend up and support lateral sides of the trough of the external belt.

12. The conveyor system of claim 8, wherein the external belt forms into a trough with steeper sides proximate to an area of engagement.

13. The conveyor system of claim 8, further comprising a plurality of carry idlers, wherein a spacing between consecutive carry idlers adjacent to an area of engagement is greater or less than the spacing between the carry idlers that are not adjacent to the area of engagement.

14. The conveyor system of claim 8, further comprising a support mechanism that facilitates at least one transition length of engagement or disengagement of the external belt and the internal belt, the support mechanism comprising at least one of air-support panels, slider pads, or small-diameter idlers.

15. The conveyor system of claim 14, wherein the support mechanism is supported from above such that at least portions of lateral trough walls of the internal belt are in close proximity to at least portions of lateral trough walls of the external belt.

16. The conveyor system of claim 8, wherein the external belt is flattened to facilitate engaging and/or disengaging the internal belt.

17. The conveyor system of claim 16, further comprising a cover belt configured to form an inverted trough to contain a material load on the flattened external belt.

18. The conveyor system of claim 1, further comprising a control system, wherein:
the at least a first drive pulley comprises a first set of drive pulleys, the at least a second drive pulley comprises a second set of drive pulleys, and
the control system controls a torque of at least one of the first set of drive pulleys or the second set of drive pulleys to achieve substantially equal load sharing by each of the external and internal belt.

19. The conveyor system of claim 1, wherein a maximum tension carried by the internal belt is equal to a maximum tension carried by the external belt.

20. The conveyor system of claim 1, wherein the internal belt and the external belt have separate tail pulleys.

21. The conveyor system of claim 1, wherein the internal belt and the external belt have separate tensioning pulleys.

22. The conveyor system of claim 17, wherein the cover belt includes an edge member having an attachment portion connected to a portion of at least one longitudinal edge of the cover belt, and further having a foot portion disposed opposite the attachment portion, the foot portion being operable to contact and provide a seal against the external belt.

23. The conveyor system of claim 22, further comprising a plurality of carry idlers wherein a spacing of consecutive carry idlers is smaller in an area along the external belt in which the cover belt and the external belt are in sealing engagement with each other, than a spacing of consecutive carry idlers in areas in which the external belt is not engaged with the cover belt so as to create an improved seal between the external belt and the cover belt.

24. A long run conveyor system, at least a portion of the long run conveyor system traversing a slope sufficiently steep such that tensile forces associated with overcoming the effects of the slope is greater per unit length than tensile forces per unit length of run due to main frictional resistance of the conveyor system, the conveyor system comprising:
an external belt defining a continuous loop, the continuous loop traversing the entire route of the conveyor system and configured to carry a material load to be transported across the entire route;

an internal belt positioned inside the continuous loop of the external belt and traversing substantially the entire route of the conveyor system, an upper side of the internal belt operably engaging an underside of the external belt;

at least a first drive pulley comprising a first set of drive pulleys, the at least a first drive pulley being in operable communication with the external belt and configured to drive the external belt;

at least a second drive pulley comprising a second set of drive pulleys, the at least a second drive pulley being in operable communication with the internal belt and configured to drive the internal belt, the external and internal drive pulleys further configured to drive their respective belts such that each of the internal belt and the external belt respectively has an approximately equal amount of belt tension; and a control system that controls a torque of at least one of the first set of drive pulleys or the second set of drive pulleys to achieve substantially equal load sharing by each of the external and internal belt.

* * * * *